3,257,261
COMPOSITION COMPRISING A BLEND OF A VINYL CHLORIDE POLYMER AND A POLYURETHANE
Jerome Hochberg, Newburgh, N.Y., assignor to E. I. du Pont de Nemours & Co., Wilmington, Del., a corporation of Delaware
No Drawing. Filed May 15, 1957, Ser. No. 659,205
7 Claims. (Cl. 161—88)

This invention relates to polymeric compositions and more particularly to vinyl chloride polymer compositions modified with the reaction product of at least one polyalkyleneether glycol and at least one organic diisocyanate.

Vinyl chloride polymers, that is, homopolymers and copolymers of vinyl chloride, are used extensively in supported and unsupported sheets and films, coatings, and molded and cast objects. Heretofore, articles made from polyvinyl chloride and copolymers thereof have had very poor low-temperature pliability and impact resistance. Upholstery of vinyl chloride polymers in automobiles cracks when it is accidently kicked on a very cold day. Luggage which is covered with vinyl chloride polymers often cracks and splits when it is handled in cold weather.

In an effort to improve the low temperature properties of vinyl chloride polymers, large quantities of plasticizer have been added to the polymers; however, these large amounts of plasticizer destroy many of the desirable properties of the vinyl chloride polymers. For example, highly plasticized, unsupported sheets of the polymers are limp and do not have the body desirable for such applications as interior coverings on automobile doors.

I have discovered modified vinyl chloride polymer compositions which have excellent low-temperature properties.

The polymeric compositions of this invention comprise 100 parts by weight of vinyl chloride polymer and up to 100 parts by weight of the reaction product of at least one polyalkyleneether glycol and at least one organic diisocyanate. One preferred composition useful for supported and unsupported sheets and films comprises 100 parts by weight of vinyl chloride polymer, about from 5 to 40 parts by weight of the polyalkyleneether glycol-diisocyanate reaction product and about from 5 to 150 and preferably 20 to 50 parts by weight of plasticizer for the vinyl chloride polymer. Conventional pigments, dyes, lakes, and toners, thermal stabilizers, and fillers, in amounts commonly used for compounding vinyl chloride polymers, can also be added to the composition.

The vinyl chloride polymer component of the compositions can be a homopolymer of vinyl chloride, a copolymer of vinyl chloride containing a major portion (usually at least 85% by weight) of vinyl chloride as well as mixtures of homopolymers, copolymers, and one or more homopolymers with one or more copolymers thereof. Monomers which can be copolymerized with vinyl chloride to yield vinyl chloride polymers useful in this invention include, for example, vinyl acetate, vinylidene chloride, acrylonitrile, and maleic, fumaric and acrylic acid esters.

The polyalkyleneether glycol-diisocyanate polymers which are used to modify the vinyl chloride polymer component are formed by the reaction of at least one polyalkyleneether glycol with a molar excess of at least one organic diisocyanate at about 50° to 120° C. The resulting products are isocyanate-terminated polyurethanes having molecular weights of about from 750 to 8000 and preferably 800 to 3500. These polyurethanes can be mixed with the vinyl chloride polymer directly or they can be chain-extended before they are added to the vinyl chloride polymer. The unchain-extended polyurethanes usually are viscous liquids or waxy solids; the chain-extended polyurethanes are normally elastomeric solids. The aforementioned polyurethanes can be chain-extended with a compound having two, and only two functional groups bearing active hydrogen, such as, for example, water, hydrazine, diamines, amino alcohols, amino acids, hydroxy acids and glycols. Water, which is a preferred chain-extending agent, reacts with an —NCO group to form an amino group and liberates carbon dioxide. The resulting amino group reacts with another —NCO group to join two polyurethane molecules through a urea group. Thus, water functions as if it had two active hydrogens. The chain-extension reactions are usually carried out at moderate temperatures below 120° C. and often, particularly for hydrazine-extended polymers, at about room temperature.

The polyalkyleneether glycols used in the polyurethanes and chain-extended polyurethanes include, for example, polyethyleneether glycol, polypropyleneether glycol, polytetramethyleneether glycol, polyhexamethyleneether glycol, polyoctamethyleneether glycol, polydecamethyleneether glycol or mixtures thereof. Polyether glycols containing several different radicals in the molecular chain, such as the compound $HO(CH_2OC_2H_4O)_nH$ where $n$ is an integer greater than 1, can be used. Also, the alkylene radicals in the molecular chain can have substituents which are not reactive with isocyanates such as, for example, halogen, alkyl and alkylene radicals.

Aromatic, aliphatic or cycloaliphatic diisocyanates or combinations thereof can be reacted with the polyalkylene-ether glycols to yield the polyurethane modifiers. Such diisocyanates include for example, 4-methyl-m-phenylene diisocyanate, m-phenylene diisocyanate, 4,4'-biphenylene diisocyanate, methyl bis(4-phenyl isocyanate), 4-chloro-1,3-phenylene diisocyanate, 1,5-naphthalene diisocyanate, 1,4-tetramethylene diisocyanate, 1,6-hexamethylene diisocyanate, 1,10-decamethylene diisocyanate, 1,4-cyclohexylene diisocyanate, 4,4'-methylenebis(cyclohexylene isocyanate) and 1,5-tetrahydronaphthalene diisocyanate. Arylene diisocyanates, that is, those in which the isocyanate groups are attached to the aromatic ring, are preferred. In general, they react more rapidly than do the alkylene diisocyanates.

The preparation of the polyurethanes and chain-extended polyurethanes shown above is described in more detail in British Patent 731,071, Italian Patent 523,505, U.S. Patent 2,702,797 and copending application, Serial No. 556,071, filed Dec. 29, 1955 by Frankenburg and Frazer. (Pat. No. 2,957,852, issued October 25, 1960.)

The polyurethanes and chain-extended polyurethanes which are used to modify the vinyl chloride polymers in the composition of this invention are not plasticizers, that is, at room temperature they have no appreciable effect on the extensibility and pliability of the vinyl chloride polymer compositions (compare Examples I and VIII). To get flexible products suitable, for example, for upholstery, conventional plasticizers such as those mentioned hereinafter must be added to the composition of this invention. Rigid articles with excellent low-temperature properties, suitable, for example, for floor and wall coverings, can be made by using a polyurethane or chain-extended polyurethane modifier and no plasticizer.

Plasticizers for the vinyl chloride polymers include, for example, di(2-ethyl hexyl)phthalate, dioctyl phthalate, tricresyl phosphate, di(butoxyethyl)phthalate, dibutyl phthalate, methoxyethyl acetyl ricinoleate, sebacic acid esters such as dibutyl sebacate and di(butoxyethyl)-sebacate, epoxidized soya-bean oil, di(2-ethyl hexyl)-azelate, didecyl adipate, diisooctyl adipate, butyl isodecyl phthalate, isooctyl palmitate, octyl decyl phthalate, didecyl phthalate, isooctyl isodecyl phthalate, dioctyl sebacate, triethyleneglycol dipelargonate and combinations thereof.

Other minor constituents which optionally can be added to the polymer compositions of this invention include, for example, thermal stabilizers, such as, barium and cadmium salts of coconut oil acids, tetrasodium phosphate, tribarium orthophosphate, alkali metal monosulfides, oxides of lead, barium and cadmium, perborates of Group II metals, alkaline earth ricinoleates, and antimony, zinc, sodium and cadmium arsenates and arsenites; fillers, such as, clays, talcs, calcium carbonate, aluminum silicate, barytes, and titanium dioxide; and pigments, such as, zinc oxide, antimony oxide, titanium dioxide, prussion blue and metal chromates.

The composition of this invention can be compounded and formed by a number of different procedures. One preferred method of preparing unsupported sheets and films is to separately mix the vinyl chloride polymer, plasticizer and any other ingredient such as thermal stabilizers, fillers and pigments on an Banbury mixer, rubber mill or other suitable means. The unchain-extended polyurethane can then be added directly to the vinyl chloride polymer mixture. After the resulting composition is thoroughly mixed, it is ready for use, and can, for example, be sheeted on a calender. If the chain-extended polyurethane elastomer is used in the polymeric composition, it is first worked into a plastic mass on a hot mill held at a temperature of about from 200° to 400° F. Next, the vinyl chloride polymer mixture is added to the elastomer on the mill and the resulting composition is worked into a homogeneous mass, then calendered.

Plastisols of the polymeric composition can be prepared by dispersing finely divided vinyl chloride polymer in a mixture consisting principally of liquid plasticizer and unchain-extended polyurethane. The plastisols can be coated or cast, then heated to dissolve the vinyl chloride polymer in the plasticizer, thereby forming a homogeneous mixture. Solutions of the polymeric composition in, for example, tetrahydrofuran, N,N'-dimethyl formamide, chloroform, methylene chloride, dioxane, methylethyl ketone, 1,1,2-trichloroethylene or mixtures thereof can be cast or coated by conventional techniques. The polymeric composition can also be molded or extruded by conventional methods.

The polymeric composition of this invention can be used as a coating or impregnant for fabrics and other materials and can be formed into a wide variety of articles including supported and unsupported sheets and films and cast and molded objects useful, for example, for bookbinding, interior door and wall coverings for automobiles, welting material, handbags, lamp shades and floor tiles. Articles made from this composition have excellent low-temperature properties, particularly pliability and impact resistance. In addition, articles made from the composition of this invention have good resistance to darkening when exposed to ultraviolet light and good resistance to soiling.

The following examples are intended to illustrate the invention and not to limit it in any way. Parts are by weight unless otherwise specified.

EXAMPLE I

A plasticized vinyl chloride polymer composition was prepared by mixing the following materials:

| | Parts |
|---|---|
| Copolymer of 95 parts of vinyl chloride and 5 parts of vinyl acetate—"Vinylite" VYNW No. 5 (Carbide and Carbon Chemical Co.) | 100 |
| Di(2-ethyl hexyl)phthalate | 37 |
| Thermal stabilizer mixture co-precipitated mixture of barium and cadmium salts of coconut oil acids, principally lauric acid | 2 |
| "Vanstay S" (H. T. Vanderbilt Co.) (Complete mixture of organic borates, phosphites and epoxy compounds) | 1 |
| Calcium carbonate | 40 |
| Pigment | 8 |
| | 188 |

A polyurethane was prepared by reacting 1.0 mole of polytetramethyleneether glycol having a molecular weight of about 1000 with about 1.6 moles of 4-methyl-m-phenylene diiosocyanate at about 100° C. in a heavy-duty mixer. The resulting liquid product had a molecular weight of about 3400. Fifteen parts of the polyurethane were next added to 188 parts of the plasticized vinyl chloride polymer composition, then, after it had been thoroughly worked, the resulting polymeric composition was calendered to a 12-mill film. The resulting product had the following properties:

| | |
|---|---|
| Tensile strength, lbs./in. | 25 |
| Elongation at break, percent | 200 |
| Tongue-tear strength, lbs. (W/F) | 1.8/1.0 |
| S-fold pliability, inches: | |
| 70° F., 75 grams | 0.3 |
| 0° F., 250 grams | 1.8 |
| Cold crack temperature, ° F. | <−50 |
| Impact resistance, ° F. | <−40 |

The letters "W" and "F" in "(W/F)" refer to the machine and cross-machine directions, respectively. The tongue-tear test is performed in accordance with A.S.T.M. Method D39–49.

The S-fold pliability is determined by bending a 3-inch square sheet of the composition so that in cross-section it has the shape of an upright "S." Next, the bent sheet is slipped over two substantially vertical pins which pass through holes near the edges of the sheet and hold the sheet in its upright "S" shape. Finally, a weight is placed on top of the "S" and the height from the top to the bottom of the "S," in inches, is measured after about one minute.

The cold-crack temperature is the temperature at which a piece of the sheet folded on itself begins to crack at the fold.

The impact resistance is determined by bending an 8-inch square sheet of the polymeric composition over the top of a sponge rubber block, then dropping a five-pound weight a distance of approximately 9 inches onto the sheet. The temperature at which the impact of the weight breaks the sheet is measured.

The product of this example is useful for covering the interior door panels on automobiles.

For comparison, a 12-mil sheet of polymeric composition was prepared from the same materials and by the same procedure shown above except that 15 parts of di(2-ethyl hexyl)phthalate were substituted for the polyurethane reaction product of polytetramethyleneether glycol and 4-methyl-m-phenylene diisocyanate. The resulting product had the following inferior low temperature properties.

| | |
|---|---|
| Cold crack temperature, ° F. | −20 |
| Impact resistance, ° F. | 0 |
| S-fold pliability, inches: | |
| 70° F., 75 grams | 0.25 |
| 0° F., 250 grams | 1.8 |

Because of its higher plasticizer to vinyl chloride polymer ratio, this sheet was more pliable at room temperature than the product with the polyurethane; however, the product without polyurethane stiffened more rapidly than decreasing temperature, and at 0° F., its pliability was comparable to that of the polyurethane-modified sheet. The cold-crack temperature and impact resistance of the product without polyurethane were greatly inferior to the excellent properties of the product with polyurethane shown in this example.

The plasticized vinyl chloride polymer composition of this example and other standard formulations which do not contain either chain-extended or unchain-extended polyurethanes darken after they have been exposed to ultraviolet light for about 250 to 500 hours. The polymeric compositions of this invention do not darken when they are exposed to ultraviolet light.

EXAMPLE II

A plasticized vinyl chloride polymer composition was prepared from the materials and by the procedure of Example I, except that a polyurethane similar to the one shown in Example I was chain-extended to form an elastomeric polyurea before it was added to the plasticized vinyl chloride polymer. This was done by adding about 0.4 part of water to the polyurethane reaction product of 200 parts of polytetramethyleneether glycol having a molecular weight of 1000 and 24 parts of 4-methyl-m-phenylene diisocyanate, holding the resulting mixture at 160° F. for 15 minutes, then adding about 27 more parts of 4-methyl-m-phenylene diisocyanate and continuing the heating at 160° F. for 2 hours. About 8 more parts of water were then added to the resulting material and the reaction was continued for 21 more minutes. Finally, the resulting elastomer was transferred to a rubber mill and stabilized by the addition of 1.5 parts of piperidine.

Fifteen parts of the elastomer just described were milled into a plastic mass on a rubber mill held at about 315° F., then 188 parts of the plasticized vinyl chloride polymer were milled with it. A calendered 12-mil film of the resulting polymeric composition had the following properties:

Tensile strength, lbs./in. _____ 27
Elongation at break, percent _____ 200
Tongue-tear strength, lbs. (W/F) _____ 1.6/1.0
S-fold pliability, inches:
    70° F., 75 grams _____ 0.3
    0° F., 250 grams _____ 2.1
Cold crack temperature, ° F. _____ <−60
Impact resistance, ° F. _____ <−30

EXAMPLE III

A polymeric composition having the following formulation was prepared by the procedure shown in Example I:

Parts
Copolymer of 95 parts of vinyl chloride and 5 parts
    of vinyl acetate (same as Example I) _____ 100
Di(2-ethylhexyl)phthalate _____ 30
Thermal stabilizer mixture (same as Example I) ___ 3
Calcium carbonate _____ 40
Pigment _____ 8
Polyurethane (same as Example I) _____ 20
                                                    ———
                                                    201

A 12-mil film of this polymeric mixture had the following properties:

Tensile strength, lbs./in. _____ 25
Elongation at break, percent _____ 135
S-fold pliability, inches:
    70° F., 75 grams _____ 2.25
    0° F., 250 grams _____ 2.4
Cold crack temperature, ° F. _____ −50
Impact resistance, ° F. _____ −20

EXAMPLE IV

Example III was repeated; however, 20 parts of the chain-extended polyurethane elastomer shown in Example II were substituted for the polyurethane used in Example III. A 12-mil sheet of the resulting composition had the following properties:

Tensile strength, lbs./in. _____ 21
Elongation, at break, percent _____ 210
S-fold pliability, inches:
    70° F., 75 grams _____ 1.0
    0° F., 250 grams _____ 1.9
Cold crack temperature, ° F. _____ −50
Impact resistance, ° F. _____ −40

EXAMPLE V

The following polymeric compositions were prepared by the procedure shown in Example I from the following materials:

|  | Parts | |
|---|---|---|
|  | Sample A | Sample B |
| Polyvinyl chloride homopolymer-"Marvinol" VR-30 (U.S. Rubber Co.) | 100 | 100 |
| Plasticizer: | | |
| Polypropylene adipate (Molecular weight 2,200, Viscosity at 25° C., 25 poises) | 25 | |
| Epoxidized soy-bean oil (Molecular weight 1,000, Viscosity at 25° C., 324 poises) | 5 | |
| Di-(2-ethyl hexyl)azelate | | 10 |
| Di-(2-ethyl hexyl)phthalate | 10 | 5 |
| Thermal stabilizer: | | |
| Lead orthosilicate-silica gel mixture | 3 | |
| Cadmium-barium salt mixture (Similar to Example I) | | 4 |
| Calcium carbonate | 50 | |
| Pigment | | 5 |
| Chain-extended polyurethane (same as Example II) | 20 | 40 |
|  | 213 | 164 |

Two 12-mil film of the resulting compositions had the following properties:

|  | Parts | |
|---|---|---|
|  | Sample A | Sample B |
| S-fold pliability, inches: | | |
| 70° F., 100 grams | 0.25 | |
| 70° F., 75 grams | | 1.8 |
| 0° F., 100 grams | 2.3 | |
| Cold crack temperature, ° F | −35 | −80 |
| Impact Resistance, ° F | <−10 | <−40 |

EXAMPLE VI

The procedure of Example I was repeated except that the amount of polyurethane was increased from 15 to 25 parts per hundred parts of vinyl chloride polymer. A 12-mil film of the resulting composition had the following properties:

Tensile strength, lbs./in. _____ 24
Elongation at break, percent _____ 200
S-fold pliability, inches:
    70° F., 75 grams _____ 0.3
    0° F., 250 grams _____ 2.3
Cold crack temperature, ° F. _____ −60
Impact resistance, ° F. _____ <−30

EXAMPLE VII

A polymeric composition was prepared from the following materials by the procedure shown in Example I.

| | Parts |
|---|---|
| Copolymer of 95 parts of vinyl chloride and 5 parts of vinyl acetate (same as Example I) | 100 |
| Plasticizer: | |
|     Di(2-ethyl hexyl)phthalate | 38 |
|     Hydrogenated terphenyl | 12 |
|     Epoxidized soy-bean oil (molecular weight 1000 viscosity of 3 to 4 poises at 25° C.) | 3 |
| Thermal stabilizer mixture (same in Example I) | 3 |
| Pigment | 7 |
| Polyurethane (same as Example I) | 8 |
| | 171 |

A 12-mil film of the resulting composition had the following properties:

| | |
|---|---|
| Tensile strength, lbs./in. | 25 |
| Elongation at break, percent | 230 |
| S-fold pliability, inches: | |
|     70° F., 75 grams | 0.2 |
|     0° F., 250 grams | 1.4 |
| Tongue-tear strength lbs. (W/F) | 2/1 |
| Cold crack temperature, ° F. | −40 |
| Impact resistance, ° F. | −20 |

EXAMPLE VIII

An unsupported sheet of modified vinyl chloride polymer was prepared from the following materials by the procedure shown in Example II:

| | Parts |
|---|---|
| Copolymer of 90 parts of vinyl chloride and 10 parts of vinyl acetate—"Vinylite" VYNS (Carbide and Carbon Chemical Co.) | 100 |
| Plasticizer: | |
|     Di-(2-ethyl hexyl)phthalate | 5 |
|     Epoxidized soy-bean oil (same as Example VII) | 2 |
| Thermal stabilizer (similar to Example I) | 4 |
| Pigment | 5 |
| Chain-extended polyurethane (same as Example II) | 15 |
| | 131 |

A 12-mil calendered sheet of the polymeric composition had the following properties:

| | |
|---|---|
| Tensile strength, lbs./in. | 75 |
| Elongation, at break, percent | 6 |
| Tongue-tear strength lbs. (W/F) | 1.0/1.2 |
| S-fold pliability, inches: | |
|     70° F., 75 grams | 3.00 |
| Cold crack temperature, ° F. | −70 |
| Impact resistance, ° F. | <−40 |

Because of the low plasticizer content of the composition, the sheet made therefrom was relatively stiff. Calendered sheets of the composition were suitable for a floor covering.

A 12-mil sheet of a polymeric composition similar to that of this example but containing no chain-extended polyurethane and 18 instead of 5 parts of di(2-ethylhexyl)phthalate had an elongation at break of 70%, an S-fold pliability (70° F., 75 grams) of 2.75 inches, a cold-crack temperature of 10° F., and an impact resistance of greater than 10° F.

EXAMPLE IX

A series of 10% solutions were formed by dissolving various mixtures of vinyl chloride homopolymer ("Geon" 121—B. F. Goodrich Chemical Co.) and the polyurethane shown in Example I in a solvent consisting of equal weights of dimethyl formamide and tetrahydrofuran. These solutions were cast into films which were dried to give unplasticized products having the following properties:

| Parts Polyurethane Per 100 Parts of Polyvinyl Chloride | Thickness, Mils | Tensile Strength, Lb./Sq. In. | Elongation at break, Percent | Cold Crack Temp., ° F. |
|---|---|---|---|---|
| 25 | 2.7 | 3,800 | 50 | <−100 |
| 43 | 2.5 | 4,300 | 225 | <−100 |
| 67 | 2.9 | 3,900 | 330 | <−100 |
| 100 | 4.4 | 2,700 | 380 | <−100 |

Films as described above are suitable for packaging materials and for protective coverings. The polymeric solutions can be used as impregnants for woven and non-woven fabrics and as coating compositions.

A sized, woven nylon fabric formed from 3-denier, 1½ inch long nylon fibers was impregnated with the polymeric solution containing equal parts of polyurethane and polyvinyl chloride, then dried. The resulting product which had a 1:1 fiber to binder ratio had excellent low temperature properties.

Laminates formed by calendering the films of this example or the unsupported sheets shown in the preceding examples with a fabric also show excellent low temperature properties.

EXAMPLE X

A series of 10% solutions was formed by dissolving various mixtures of vinyl chloride homopolymer ("Marvinol" VR–10–U.S. Rubber Co.) and a polyurethane chain-extended with hydrazine in a mixture of tetrahydrofuran and dimethyl formamide. These solutions were cast and dried to give unplasticized films about 4 mils thick. Three samples which had 43, 67 and 100 parts of polyurethane per 100 parts of vinyl chloride homopolymer, each had a cold crack temperature of less than about −80° F.

The chain-extended polymer used in this example can be prepared by heating about 28 moles of polytetramethyleneether glycol having a molecular weight of about 1000 with about 14 moles of 4-methyl-m-phenylene diisocyanate at about 212° F. for 3 hours. The resulting product with hydroxyl end groups is then reacted with about 14.5 moles of methylene bis(4-phenyl isocyanate) at 212° F. for 1 hour to form a "capped" polymer with isocyanate end groups. Next, the "capped" polymer is dissolved in about 14 liters of dimethyl formamide and chain-extended at room temperature with about 0.55 mole of hydrazine hydrate dissolved in about 0.55 liter of dimethyl formamide. The resulting chain-extended polymer solution contains about 22% by weight of solids and has a viscosity of about 400 poises at 30° F.

I claim:
1. A polymeric vinyl composition having improved low-temperature properties and being the product of intimately mixing together a vinyl chloride polymer and a linear polyalkyleneether-polyurethane,
    said vinyl chloride polymer being a member of the group consisting of vinyl chloride homopolymers and copolymers of vinyl chloride with one or more monomers selected from the group consisting of vinyl acetate, vinylidene chloride, acrylonitrile and esters of maleic, fumaric and acrylic acids, and in which the vinyl chloride is the major component by weight,
    and said polyalkyleneether-polyurethane being a polymeric substance of the group consisting of
        (a) the isocyanate-terminated reaction product of a hydroxyl terminated linear polyalkylene ether with a molar excess of a hydrocarbon diisocyanate, and
        (b) the elastomeric product obtained by subjecting the aforementioned isocyanate-terminated reaction product to chain-extension with a compound containing two, and only two, hydrogen atoms which are reactive toward the radical NCO, the quantities of said vinyl chloride polymer and linear polyalkyleneether-polyurethane mixed together being in the ratio of 15 to 100 parts by weight of the latter for each 100 parts by weight of the former.

2. A polymeric vinyl composition as in claim 1, said composition containing further from 5 to 150 parts by weight of a plasticizer for said vinyl chloride polymer.

3. A laminate comprising a fabric in adherent contact with a layer of a polymeric vinyl composition as defined in claim 1.

4. A polymeric vinyl composition comprising 100 parts by weight of a vinyl chloride polymer and from 15 to 100 parts by weight of a linear polyalkyleneether-polyurethane, said vinyl chloride polymer being a member of the group consisting of vinyl chloride homopolymers and copolymers of vinyl chloride with one or more monomers selected from the group consisting of vinyl acetate, vinylidene chloride, acrylonitrile and esters of maleic, fumaric and acrylic acids, and in which the vinyl chloride is the major component by weight, and said polyalkyleneether-polyurethane being the elastomeric product obtained by reacting a hydroxyl terminated linear polyalkylene ether with a molar excess of a hydrocarbon diisocyanate, and subjecting the resulting isocyanate-terminated, intermediate reaction product to chain extension with a compound containing two, and only two, hydrogen atoms which are reactive toward the radical NCO.

5. A polymeric vinyl composition as in claim 4, said chain-extending compound being a member of the group consisting of water and hydrazine.

6. A polymeric vinyl composition comprising 100 parts by weight of a vinyl chloride homopolymer and from 15 to 100 parts by weight of a linear polyalkyleneether-polyurethane, said polyalkyleneether-polyurethane being the elastomeric product obtained by reacting a hydroxyl terminated linear polyalkyleneether with a molar excess of a hydrocarbon diisocyanate, and subjecting the resulting isocyanate-terminated, intermediate reaction product to chain-extension with hydrazine.

7. A composition comprising a blend of a vinyl chloride polymer of the group consisting of vinyl chloride homopolymer, and copolymers of vinyl chloride with one or more monomers selected from the group consisting of vinyl acetate, vinylidene chloride, acrylonitrile and esters of maleic, fumaric and acrylic acids, in which vinyl chloride is the major component by weight, and up to 20%, based on the total composition, of a polyurethane which is a polymeric substance of the group consisting of (a) the isocyanate-terminated reaction product of a hydroxyl terminated linear polyalkylene ether with a molar excess of a hydrocarbon diisocyanate, and (b) the elastomeric product obtained by subjecting the aforementioned isocyanate-terminated reaction product to chain extension with a compound containing two, and only two, hydrogen atoms which are reactive toward the radical NCO.

References Cited by the Examiner

UNITED STATES PATENTS

| | | | |
|---|---|---|---|
| 2,118,017 | 5/1938 | Safford | 260—30 |
| 2,606,162 | 8/1952 | Coffey et al. | 260—75 |
| 2,852,483 | 9/1958 | Mason | 260—77.5 |
| 2,891,876 | 6/1959 | Brown | 117—72 |
| 2,948,691 | 8/1960 | Windemuth et al. | 260—2.5 |

MURRAY TILLMAN, *Primary Examiner.*

DONALD E. CZAJA, DANIEL ARNOLD, LEON J. BERCOVITZ, WILLIAM H. SHORT, *Examiners.*

M. FOELAK, *Assistant Examiner.*